United States Patent Office 3,109,098
Patented Oct. 29, 1963

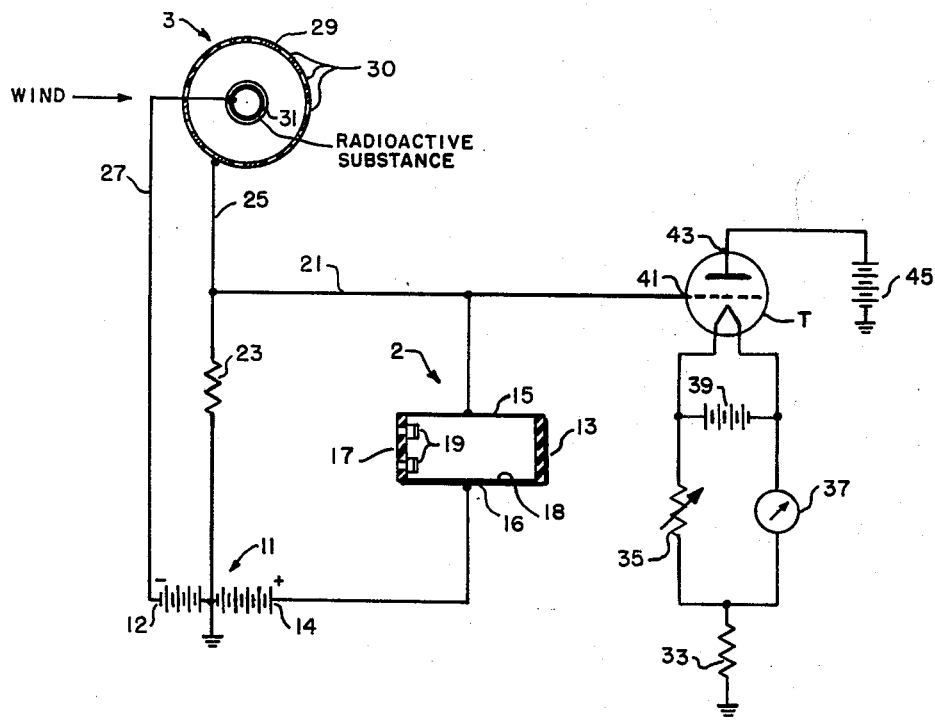

3,109,098
NUCLEAR ELECTRONIC ANEMOMETER
Abraham E. Cohen, 1201 Chestnut Ave.,
Wanamassa, N.J.
Filed Apr. 14, 1960, Ser. No. 22,370
3 Claims. (Cl. 250—83.6)
(Granted under Title 35, U.S. Code (1952), sec. 266)

The invention described herein may be manufactured and used by or for the Government for governmental purposes without the payment of any royalty thereon.

The present invention relates to a wind speed measuring device or anemometer, and more particularly to an omnidirectional compensated anemometer of the nuclear type.

A nuclear anemometer measures atmospheric wind velocity in a purely electrical manner with no moving parts. The wind is allowed to pass between two spaced electrodes, which are maintained at different D.C. potentials. The air between the electrodes is ionized by means of radioactive material in the interelectrode space. The ions, being electrically charged, are attracted to the electrodes, producing a current in an external circuit. The number of ions which reach each electrode and hence the current is a function of the wind velocity, since the air molecules tend to sweep the ions out of the interelectrode space. Therefore, the current can be calibrated in terms of wind velocity. One of the disadvantages of these prior art devices is calibration errors caused by changes in ambient air pressure and temperature. The number of air molecules in a given volume varies with both temperature and pressure, and hence the number of ions produced by the collisions with the radioactive particles is a function of the air density, therefore at any given wind velocity the current output of the anemometer will depend to some degree on air pressure and temperature. These factors can cause large errors in portable equipment which may be used at widely varying altitudes. The present invention compensates for these errors by providing a second electrode structure which is not exposed to the wind stream, but is open to the atmosphere. The compensating chamber is electrically connected in opposition to the anemometer in such a manner that errors caused by changes in air pressure and temperature are cancelled out in the measuring circuit.

Therefore, it is an object of this invention to provide an improved nuclear anemometer with automatic compensation for ambient conditions.

The electrode structure of the disclosed anemometer is such that wind from any direction will actuate it, eliminating the necessity for mechanical devices for turning it into the wind. Therefore, a further object of the invention is to provide an omnidirectional compensated anemometer with no moving parts.

The novel features of this invention are set forth with particularity in the appended claims. The invention itself, both as to its organization and method of operation, together with additional objects and advantages may be understood with reference to the following description taken in conjunction with the accompanying drawing, which illustrates a preferred embodiment of the invention.

The drawing is a schematic diagram of the device which illustrates the novel features thereof.

In the sole FIGURE of the drawing, the wind sensing unit or anemometer is denoted generally by the character 3. This unit is composed of two concentric spheres, 29 and 31, the outer one of which is provided with a plurality of holes for the passage of air therethrough. The outside of the inner sphere 31 is coated with a radioactive substance capable of ionizing the air in the space between the spheres. In a preferred embodiment, the radio-isotope Radium 266 was used as the radioactive source. This isotope produces primarily alpha rays which, due to their relatively high mass, can easily ionize air by collision with the air molecules. Other alpha producing substances such as polonium 210 or plutonium or gamma ray emitters may be used however, with the same results. The two spherical electrodes are connected across a source of D.C. potential 11, the outer sphere being connected to a positive grounded terminal through the load resistor 23 and the inner sphere being connected to a negative terminal 12, as illustrated. The ions produced in the interelectrode space are attracting to the electrodes as a result of the electrical field produced by the potential source 11, producing a current through the load resistor 23. Under quiescent conditions (no air movement), substantially all of the ions reach one or the other of the spherical electrodes, and the current through 23 is a maximum. Air movement causes a reduction in the number of ions which reach the electrodes and hence a reduction in current through 11, since the moving air molecules sweep the ions out of the interelectrode space before they can reach the electrodes, the number of ions swept out being proportional to the wind velocity, hence the current output of the device varies inversely with wind velocity. It can be seen that with the spherical configuration of the electrodes, wind from any direction will actuate the anemometer, without requiring any movement of the electrode structure. The electrodes are supported and spaced from each other by insulating means, not shown. The holes 30 in the outer sphere are made large enough so that negligible turbulence is created by passage of air through the device.

As pointed out above, the current output of the device depends to some extent on air pressure and temperature. A rise in pressure at a given air flow for example, will increase the number of air molecules in the interelectrode space and therefore increase the probability of a collision with an alpha particle and hence result in an increase in the number of ions produced and also current output. Air pressure changes result from normal atmospheric variations and also from changes in altitude. The latter can cause serious errors in this type of anemometer where the equipment is portable or vehicle-mounted, such as would be the case in a military field meteorological station. In order to automatically correct for these errors, I have provided a compensating chamber 2 which is connected to load resistor 23 in such a manner that it cancels out errors caused by varying air pressure and temperature. The illustrated compensation chamber comprises two flat parallel spaced electrodes 15 and 16, the lower one of which is coated with a radioactive substance 18. The chamber is blocked off from wind flow by insulated sides 13 and 17. The side 17 contains holes by means of which changes in air temperature and pressure are communicated to the interior. These holes are baffled by plates 19 to minimize air movement within the chamber and also to act as radiation shields for the protection of operating personnel.

The compensating chamber 2 has its lower electrode connected to the positive terminal 14 of potential source 11 and its upper electrode connected through load resistor 23 to the grounded center tap. With this circuit arrangement the current outputs of the anemometer and the compensating chamber flow in opposite directions in the load resistor 23. The anemometer current flows out of the center tap of 11, upward through 23, lead 25, across the interelectrode space and thence through lead 27 back to the negative terminal 12. The compensating current flows out of the positive terminal 14, across the chamber 2 and downward through resistor 23 to the grounded center tap. The electrode spacing, area and radioactive activity of the compensating chamber 2 are chosen so that the current output of 2 is the same as that of anemometer 3 under quiescent conditions. Therefore, in the absence of wind flow, the current through and voltage across resistor 23 will be zero. Further, any change in current through the anemometer 3 caused by changes in air pressure or temperature will be matched by an equal change in the output of 2 and since the two currents are differentially combined in 23, the differential current will remain constant. Wind flow through 3 will decrease the anemometer current but will not affect the compensating current, therefore an increasing positive voltage appears at the top of 23 as wind velocity increases. The voltage across 23 is amplified in a one-stage circuit comprising an electrometer tube T and applied to a microammeter 37, which is calibrated in wind velocity units. The electrometer is a triode with directly heated filament, especially designed for sensitive measurements. The tube is connected as a cathode follower with low plate voltage to prevent loading of the resistor 23. The meter 37 is connected in such a manner that the zero signal tube current is balanced out. With no signal voltage applied to the grid, the resistor 35 is adjusted so that the current from filament battery 39 flowing upwardly through the meter balances out the quiescent tube current which flows downward from cathode to ground. Positive voltage developed across the load resistor 23 then cause a proportional deflection of the meter.

Following are suggested design values for the various circuit components:

| | |
|---|---|
| Sphere 31 | .5 inch diameter. |
| Sphere 29 | 3.4 inch diameter. |
| Battery 11 | 270 volts. |
| Battery 45 | 10.4 volts. |
| Resistor 23 | $10^8$–$10^{11}$ ohms. |
| Resistor 35 | 4000 ohms. |
| Resistor 33 | 8000 ohms. |
| Meter 37 | 4000 ohms, 50 μa. |
| Tube T | Type 5886. |

The foregoing values are illustrative only and are subject to wide variation at the option of the designer.

While a preferred embodiment of the invention has been illustrated and described, it should be understood that many modifications may be made which fall within the true spirit and scope of the invention. Hence the invention should be limited only by the scope of the following claims.

What is claimed is:

1. An omnidirectional compensated nuclear anemometer including a first electrode structure comprising two conductive concentric stationary spheres, the outer sphere of which is perforated, a source of nuclear radiation positioned within the interspherical space, a second electrode structure comprising a pair of spaced electrodes with a source of nuclear radiation positioned therebetween, said first electrode structure being exposed to the wind stream to be measured and said second electrode structure being shielded therefrom; a direct potential source including two terminals of different potential and an intermediate terminal; one of said spherical electrodes being connected to one of said two terminals and the other of said spherical electrodes being connected to said intermediate terminal through a load impedance, one of said spaced electrodes of said second electrode structure being connected to the second of said two terminals, the remaining electrode of said second electrode structure being connected to said intermediate terminal through said load impedance; a connection from said load resistor to the grid of an electrometer tube, an ammeter in the cathode circuit of said tube for indicating wind velocity, and means, including the tube filament voltage source and a variable resistor, for cancelling the quiescent tube current from the meter, whereby the meter deflection is rendered directly proportional to the voltage across said load resistor.

2. An omnidirectional, compensated nuclear anemometer including a first electrode system comprising two spaced spherical conductive stationary electrodes, one of said electrodes enclosing the other electrode, the outer electrode being perforated, a source of nuclear radiation positioned within the interelectrode space; a second electrode system comprising a pair of spaced conductive electrodes with a source of nuclear radiation positioned therebetween said first electrode system being exposed to the wind stream to be measured and said second electrode system being shielded therefrom, an electric circuit including a potential source connected to each electrode system and means for differentially combining the current outputs of each electrode system, said means including an impedance element common to both of said electric circuits, and means for measuring the voltage developed across said impedance element.

3. An omnidirectional, compensated nuclear anemometer including a first electrode system comprising two spaced, spherical, concentric conductive electrodes, the interelectrode space of said electrode system being exposed to wind flow from all directions, said interelectrode space containing a source of nuclear radiation, a second electrode system comprising a pair of spaced conductive electrodes with a source of radiation positioned therebetween, said second electrode system being shielded from the said wind flow, said second electrode system being designed to pass a current equal to that passed by said first electrode system under quiescent wind flow conditions, means for producing an electrice field in each of said interelectrode spaces, means for differentially combining the currents resulting from said electric fields in a single resistor, and means for measuring the differential current through said resistor.

References Cited in the file of this patent

UNITED STATES PATENTS

| | | |
|---|---|---|
| 2,611,268 | Mellen | Sept. 23, 1952 |
| 2,627,543 | Obermaier | Feb. 3, 1953 |
| 2,637,208 | Mellen | May 5, 1953 |
| 2,702,898 | Meili | Feb. 22, 1955 |
| 2,739,478 | Offner | Mar. 27, 1956 |
| 2,858,465 | Ludeman | Oct. 28, 1958 |
| 2,861,452 | Morgan | Nov. 25, 1958 |

OTHER REFERENCES

Maley: Balanced Ionization Chambers Offer Sensitive Gas Analysis, Nucleonics, March 1960, page 126.